(12) United States Patent
Saitou (10) Patent No.: US 7,808,530 B2
(45) Date of Patent: Oct. 5, 2010

(54) IMAGE PICKUP APPARATUS, GUIDE FRAME DISPLAYING CONTROLLING METHOD AND COMPUTER PROGRAM

(75) Inventor: Yuji Saitou, Tokyo (JP)

(73) Assignee: Sony Corporation, Tokyo (JP)

( * ) Notice: Subject to any disclaimer, the term of this patent is extended or adjusted under 35 U.S.C. 154(b) by 1323 days.

(21) Appl. No.: 11/314,422

(22) Filed: Dec. 20, 2005

(65) Prior Publication Data

US 2006/0132638 A1    Jun. 22, 2006

(30) Foreign Application Priority Data

Dec. 22, 2004    (JP)    ............................ P2004-370489

(51) Int. Cl.
*H04N 5/222*    (2006.01)

(52) U.S. Cl. .............................. 348/220.1; 348/333.11; 348/333.12

(58) Field of Classification Search .............. 348/220.1, 348/333.11, 333.12

See application file for complete search history.

(56) References Cited

U.S. PATENT DOCUMENTS 6,333,753 B1 *  12/2001  Hinckley .................... 715/768
6,795,116 B1 *   9/2004  Akasawa .................. 348/231.6

FOREIGN PATENT DOCUMENTS

| JP | 7 31353 | 4/1995 |
|---|---|---|
| JP | 10 70675 | 3/1998 |
| JP | 2003 259161 | 9/2003 |
| JP | 2004 104498 | 4/2004 |

* cited by examiner

*Primary Examiner*—Jason Chan
*Assistant Examiner*—Yih-Sien Kao
(74) *Attorney, Agent, or Firm*—Frommer Lawrence & Haug LLP; William S. Frommer; Thomas F. Presson (57) ABSTRACT

An apparatus and method is disclosed which allows a user to grasp recording image regions for a moving image and a still image to be recorded actually to perform accurate image recording. An image pickup apparatus which can record moving images and still images determines forms of guide frames for a moving image and a still image based on aspect ratios for moving images and still images set in advance by a user. The guide frames are displayed on a monitor screen in response to a situation of an actual recording process. Where the image pickup apparatus is not in a state wherein image data can be recorded such as where a medium does not exist, only a guide frame for an image of a category which can be recorded is displayed together with a picked up image.

9 Claims, 6 Drawing Sheets

IMAGE PICKUP APPARATUS, GUIDE FRAME DISPLAYING CONTROLLING METHOD AND COMPUTER PROGRAM

CROSS REFERENCES TO RELATED APPLICATIONS

The present invention contains subject matter related to Japanese Patent Application JP 2004-370489 filed in the Japanese Patent Office on December, 2004, the entire contents of which being incorporated herein by reference.

BACKGROUND OF THE INVENTION

This invention relates to an image pickup apparatus, a guide frame displaying controlling method and a computer program, and more particularly to an image pickup apparatus having a configuration for presenting a guide frame indicative of a region of an image to be recorded actually in an image display section for confirmation of a picked up image such as a viewfinder set to a video camera or a display unit, and also to a guide frame displaying control method and a computer program.

In recent years, a high definition (HD) image, that is, a wide image, has been and is being used popularly as an image for being presented on a television receiver. The wide image has an aspect ratio (ratio between horizontal and vertical dimensions of an image) different from that of a conventional standard image (standard definition image).

For example, the standard image has an aspect ratio of 4:3 while the wide image has another aspect ratio of 16:9. In recent years, television receivers having a display screen having an aspect ratio ready for the wide image, that is, the aspect ratio of 16:9, have been and are increasing. Also among contents distributed for use with such television receivers or contents recorded on recording media such as a DVD (Digital Versatile Disk), contents ready for the wide image of the aspect ratio of 16:9 have been and are increasing.

Under such a tendency as described above, also with regard to video cameras used by general users, those products which can record an image of the aspect ratio of 16:9 have become available. Most of existing video cameras not only have a function of picking up moving images but also have a function of recording a still image as a snap shot of picked up images. As a recording medium of image data, a video tape, a DVD, a hard disk, a flash memory and so forth are available. Some video cameras have a function of making use of such various recording media to record moving images and still images on different recording media or to record both of moving images and still images on the same recording medium.

Although, in image recording of moving images, image recording of the wide image of the aspect ratio of 16:9 is prevailing, in image recording of still images, image recording of the standard image of the aspect ratio of 4:3 is used generally. For example, also in the fields of silver salt photographs and digital still cameras, the aspect ratio of 4:3 is used widely.

Most conventional video cameras are formed such that they have an image display section for confirmation of a picked up image such as a viewfinder or a liquid crystal display section set therein and record an image displayed on the image display section as it is as a moving image and a still image.

Among image display sections such as a view finder and a display section set to video cameras, those having an aspect ratio set to 16:9 have been and are increasing together with the popularization of display units and contents ready for the wide image in recent years. However, if it is tried to record a still image of the aspect ratio of 4:3 using a video camera having an image display section of the aspect ratio of 16:9, then the still image to be recorded does not coincide with an image displayed on the image display section. This gives rise to a problem that the user cannot accurately decide an image data region for a still image to be recorded actually.

In particular, if it is tried to apply a video camera having an image section of the aspect ratio of 16:9 to record a still image of the aspect ratio of 4:3, then a region which is not included in the still image of the aspect ratio of 4:3 exists on the opposite left and right portions of the image display section of the aspect ratio of 16:9. This gives rises to a problem that the user cannot accurately decide a recording region of a still image based on an image displayed on the image display section.

On the contrary, if it is tried to record a moving image of the aspect ratio of 16:9 using a video camera having a display section of the aspect ratio of 4:3, an actually recorded image of a moving image does not include image portions in upper and lower regions of the display section. Also in this instance, a problem arises that the user cannot accurately decide a recording region of a moving image.

Some video cameras in recent years have a function for changing over between recording of moving images of the aspect ratio of 16:3 and recording of still images of the aspect ratio of 4:3. However, in such video cameras as just described, in order to change over the image pickup mode, for example, from a mode for recording moving images of the aspect ratio of 16:9 to another mode for recording still images of the aspect ratio of 4:3, a power supply switch or a mode changeover switch must be operated. This mode changeover process is an operation cumbersome to the user who tries to pick up images, and considerable time is required therefor. This gives rise to a problem that it increases the possibility that an image pickup opportunity may be lost.

A video camera with a still camera which includes a video camera and a silver salt still camera in combination and allows simultaneous recording of a still image during image pickup of moving images is disclosed, for example, in Japanese Patent Publication No. Hei 7-31353. The video camera with a still camera disclosed in Japanese Patent Publication No. Hei 7-31353 has a configuration which uses a guide frame to display a difference in angle of view between a moving image and a still image.

According to the video camera with a still camera disclosed in Japanese Patent Publication No. Hei 7-31353, the angle of view indicative of the image pickup region where the video camera with a still camera is utilized as a still camera is normally set on the outer side of the angle of view indicative of the image pickup region where the video camera with a still camera is utilized as a video camera. However, the video camera with a still camera does not have a configuration for changing over the aspect ratio between 16:9 and 4:3. Further, in the video camera with a still camera, the same display frames are indicated permanently but are not updated in response to a changeover process of an image to be acquired. Therefore, the video camera with a still camera has a problem that a recording image region to be used in response to changeover of an image to be picked up by a user cannot be decided immediately.

SUMMARY OF THE INVENTION

It is desired to provide an image pickup apparatus, a guide frame displaying controlling method and a computer program by which a user who tries to pick up an image can grasp a recording region for an image to be recorded accurately and readily without imposing a burden on the user.

According to an embodiment of the present invention, an image pickup apparatus adapted to pick up images of different image pickup angles of view such as aspect ratios is configured such that pickup image data are displayed on a display section for confirmation of a pickup image and while an actual recording image region in the displayed image is presented by a guide frame, and the guide frame to be presented is changed over dynamically and displayed in response to a recording condition of whether the image data to be recorded represent a moving image or a still image or else parallel recording of both of a moving image and a still image is to be or being performed.

More particularly, according to an embodiment of the present invention, there is provided an image pickup apparatus including an image pickup element for picking up a subject image, a display section for outputting image data acquired by the image pickup element, and a control section for executing display control of a guide frame to be displayed as image recording region information corresponding to a recording medium on the display section. The control section executes control of determining a form of a guide frame for a moving image and a form of a guide frame for a still image based on recording mode setting information for moving images and still images set in advance and outputting the guide frames corresponding to the determined forms to the display section.

The control section may execute control of outputting and stopping the outputting of each of the guide frame for a moving image and the guide frame for a still image to the display section in accordance with whether or not a recording process of each of a moving image and a still image on a recording medium is possible, and execute control of outputting the guide frame for a moving image to the display section when the recording process of a moving image on the recording medium is possible and outputting the guide frame for a still image to the display section when the recording process of a still image on the recording medium is possible.

The image pickup apparatus may further include a contact sensor for detecting contact with a button for starting recording of moving images, the control section being adapted to receive contact detection information from the contact sensor as an input thereto and execute the control of stopping the outputting of the guide frame for a still image to the display section based on the input of the contact detection information.

The image pickup apparatus may further include a contact sensor for detecting contact with a button for starting recording of a still image, the control section being adapted to receive contact detection information from the contact sensor as an input thereto, determine based on the input of the contact detection information whether or not recording of moving images is being executed and execute the control of stopping the outputting of the guide frame for a moving image to the display section when recording of moving images is not being executed.

Preferably, the recording mode setting information for moving images and still images set in advance is a plurality of different aspect ratios which can be set to each of recording images of the moving images and the still images, and the control section determines, based on aspect ratios for a moving image and a still image set in advance, the forms of the guide frame for a moving image and the guide frame for a still image as forms corresponding to the set aspect ratios and executes the control of the guide frames of the determined forms to the display section.

According to another embodiment of the present invention, there is provided a guide frame displaying controlling method for performing display control of a guide frame to be displayed as recording region information on a display section as a monitor screen of an image pickup apparatus, including the steps of determining a form of a guide frame for a moving image and a form of a guide frame for a still image based on recording mode setting information for moving images and still images set in advance, and outputting guide frames of the forms determined at the guide frame form determination step to the display section.

Preferably, the guide frame displaying controlling method further includes a step of executing control of outputting and stopping the outputting of each of the guide frame for a moving image and the guide frame for a still image to the display section in accordance with whether or not a recording process of each of a moving image and a still image on a recording medium is possible. The controlling step executes control of outputting the guide frame for a moving image to the display section when the recording process of a moving image on the recording medium is possible and outputting the guide frame for a still image to the display section when the recording process of a still image on the recording medium is possible.

The guide frame displaying controlling method may further include the steps of receiving contact detection information from a contact sensor which detects contact with a button for starting recording of moving images, as an input to the image pickup apparatus, and executing the control of stopping the outputting of the guide frame for a still image to the display section based on the input of the contact detection information.

The guide frame displaying controlling method may further include the steps of receiving contact detection information from a contact sensor, which detects contact with a button for starting recording of a still image, as an input to the image pickup apparatus, determining based on the input of the contact detection information whether or not recording of moving images is being executed, and executing the control of stopping the outputting of the guide frame for a moving image to the display section when recording of moving images is not being executed.

Preferably, the recording mode setting information for moving images and still images set in advance is a plurality of different aspect ratios which can be set to each of recording images of the moving images and the still images. The guide frame form determining step is a step of determining, based on aspect ratios for a moving image and a still image set in advance, the forms of the guide frame for a moving image and the guide frame for a still image as forms corresponding to the set aspect ratios and executes the control of the guide frames of the determined forms to the display section.

According to a further embodiment of the present invention, there is provided a computer program for causing a computer to execute display control of a guide frame to be displayed as recording region information on a display section as a monitor screen of an image pickup apparatus, including the steps of determining a form of a guide frame for a moving image and a form of a guide frame for a still image based on recording mode setting information for moving images and still images set in advance, and outputting guide frames of the forms determined at the guide frame form determination step to the display section.

It is to be noted that the computer program of the present invention can be provided, for example, to a general purpose computer system which can execute various program codes through a recording medium or a communication medium by which the computer program is provided in a computer-readable form, for example, a storage medium such as a CD, an FD or an MO or a communication medium such as a network. Where such a program as described above is provided in a computer-readable form, processes according to the program are implemented on the computer system.

With the image pickup apparatus, guide frame displaying controlling method and computer program, the image pickup apparatus which can record moving images and still images is configured such that a form of a guide frame for a moving image and a form of a guide frame for a still image are determined based on recording mode setting information for moving images and still images set in advance by a user, particularly based on aspect ratios, and the guide frames of the determined forms are displayed on the display section as a monitor screen. Further, a guide frame or frames to be displayed on the display section are changed in response to a situation of an actual recording process. Therefore, the user can perform an accurate recording process while confirming an angle or angles of view, that is, an image region or regions to be recorded, based on the guide frame or frames displayed on the display section.

Further, with the image pickup apparatus, guide frame displaying controlling method and computer program, where the image pickup apparatus is not in a state wherein image data can be recorded such as where a medium does not exist in the image pickup apparatus, a guide frame for an image of a category which cannot be recorded (a moving image or a still image) is not displayed, but only a guide frame for an image of the other category which can be recorded is displayed together with a picked up image. Consequently, the user can recognize, based on a guide frame or frames displayed on the display section, a moving image region and/or a still image region to be recorded on the recording medium or media and information regarding whether or not recording in the region or regions is possible. Therefore, the user can readily and accurately grasp a recording image region of a moving image or a still image to be recorded actually and perform accurate recording of a moving image or a still image.

The above and other objects, features and advantages of the present invention will become apparent from the following description and the appended claims, taken in conjunction with the accompanying drawings in which like parts or elements are denoted by like reference symbols.

DETAILED DESCRIPTION OF THE PREFERRED EMBODIMENT

Figure 1:
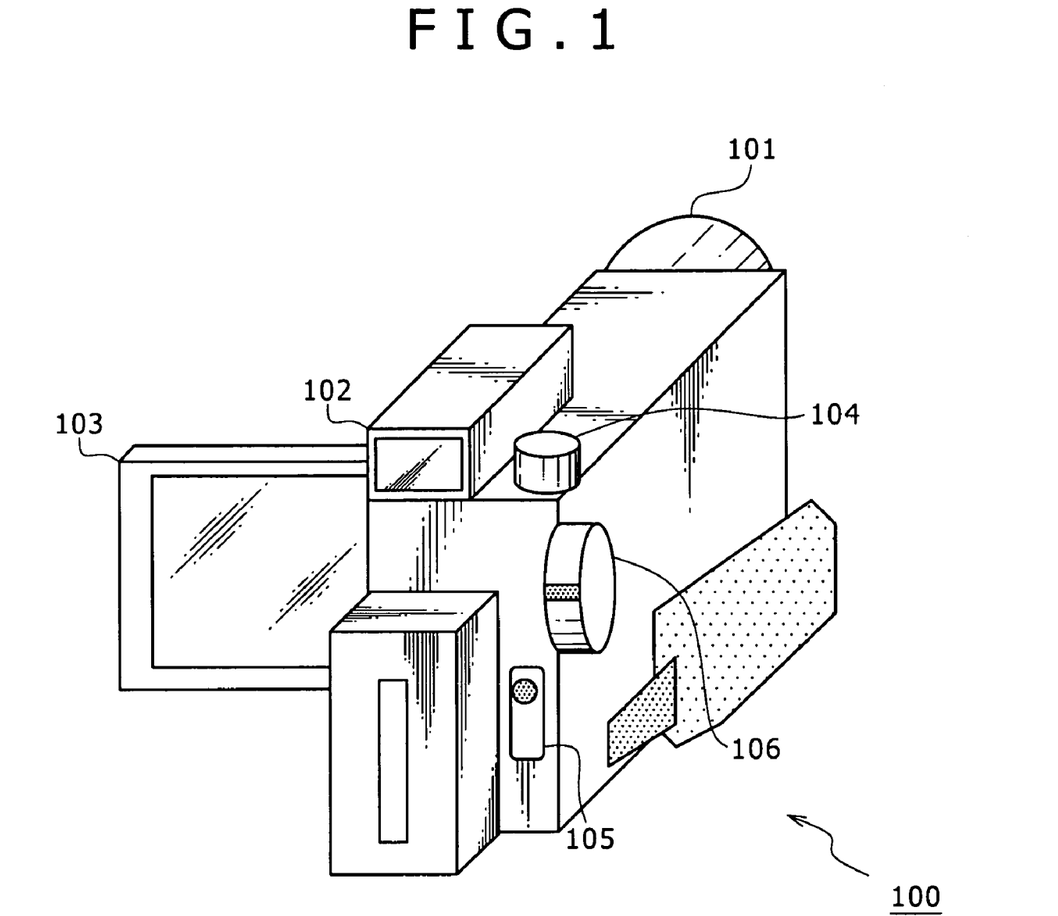
FIG. 1 is a schematic view showing an appearance of a video camera which can be applied as an image pickup apparatus of the present invention.

First, an example of a configuration of an image pickup apparatus according to the present invention is described with reference to FIG. 1. Referring to FIG. 1, the image pickup apparatus 100 shown is formed as a digital video camera. The image pickup apparatus 100 includes a lens 101 for fetching an image to be picked up therethrough, and a viewfinder 102 and a liquid crystal display section 103 each serving as a monitor screen for displaying the picked up image. The image pickup apparatus 100 further includes a still image pickup button 104 for being depressed at a recording timing of a snap shot during image pickup of moving images or the like to record a still image, a moving image pickup start/end button 105 for issuing an instruction to start and end image pickup of moving images, and a power supply switch 106.

If a user operates the power supply switch 106, then an image inputted through the lens 101 is displayed on the image display section or sections of one or both of the viewfinder 102 and the liquid crystal display section 103 each serving as a monitor screen.

An image inputted from the lens 101 is displayed on the viewfinder 102 and the liquid crystal display section 103 each serving as an image display section. Also a recording region guide frame having a recording aspect ratio for a picked up image selected by the user who is performing image pickup using the image pickup apparatus 100 is displayed under a predetermined condition.

As the recording region guide frame, a frame having an aspect ratio which depends upon the type of an image to be recorded is displayed. Display control of the guide frame is executed in response to detection information of whether or not a recording medium on which an image to be recorded by the user is in a recordable state such as whether or not a recording medium on which a recording object image of a moving image or a still image can be recorded is present. A particular control process is hereinafter described.

Now, patterns of guide frames to be displayed on the liquid crystal display section 103 are described with reference to FIG. 2. The guide frames to be displayed on the image display section are changed in response to an image pickup mode set by a user.

Figure 2A:
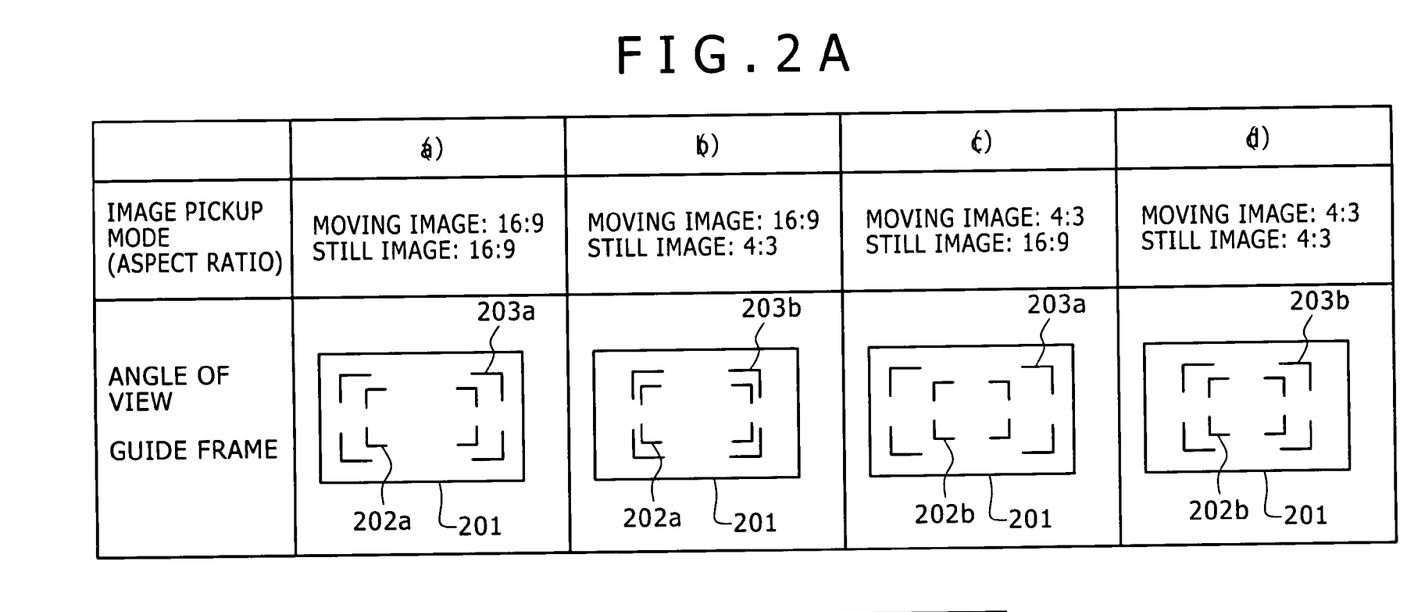
FIGS. 2A and 2B are views showing patterns of a guide frame to be displayed on a display section such as a viewfinder or a liquid crystal display section of the image pickup apparatus of the present invention.

FIG. 2A illustrates an example of displays of guide frames corresponding to four different image pickup patterns. In particular, different guide frame patterns to be displayed together with picked up image data on the viewfinder 102 and the liquid crystal display section 103 serving as the image display sections where the image pickup modes for a moving image and a still image are set in different manners are indicated as the image pickup patterns (a) to (d). More particularly, the pattern (a) indicates guide frame patterns in the image pickup modes set to the aspect ratio of a moving image: 16:9 and the aspect ratio of a still image: 16:9;

the pattern (b) indicates guide frame patterns in the image pickup modes set to the aspect ratio of a moving image: 16:9 and the aspect ratio of a still image: 4:3;

the pattern (c) indicates guide frame patterns in the image pickup modes set to
the aspect ratio of a moving image: 4:3 and
the aspect ratio of a still image: 16:9; and
the pattern (d) indicates guide frame patterns in the image pickup modes set to
the aspect ratio of a moving image: 4:3 and
the aspect ratio of a still image: 4.3.

Figure 2B:
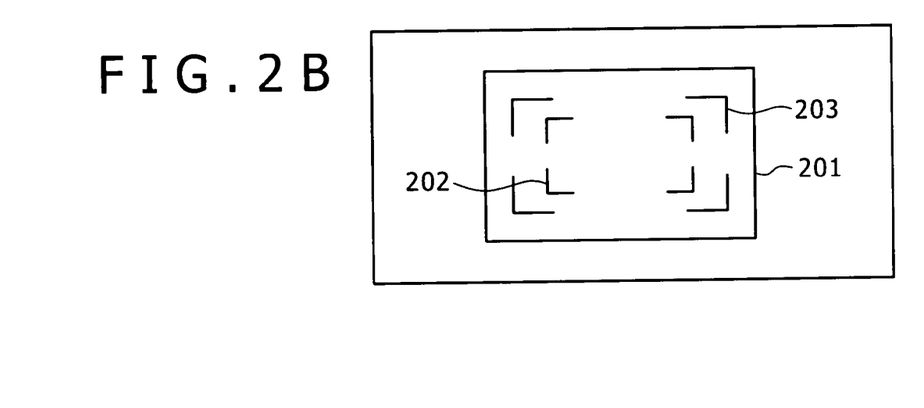

As seen from FIG. 2B, a guide frame 202 for a moving image and a guide frame 203 for a still image can be displayed in a picked up image display region 201. It is to be noted that the guide frames are displayed under the condition that respective image data can be recorded. Accordingly, for example, where a recording medium which can record moving images such as, for example, a DVD is applied as a moving image recording medium, if a recordable DVD is not loaded in the image pickup apparatus, then the guide frame 202 for a moving image is not displayed on the image display section, but if a recordable DVD is loaded in the image pickup apparatus, then the guide frame 202 for a moving image is displayed. Similarly, for example, where a flash memory is applied as a still image recording medium, if a recordable flash memory is not loaded in the image pickup apparatus, then the guide frame 203 for a still image is not displayed on the image display section, but if a recordable flash memory is loaded in the image pickup apparatus, then the guide frame 203 for a still image is displayed. Details of the control are hereinafter described.

In the table shown in FIG. 2A, the pattern (a) corresponds to the image pickup mode wherein the aspect ratio of a moving image is 16:9 and the aspect ratio of a still image is 16:9. The pattern (a) represents that a 16:9 guide frame 202a for a moving image having the aspect ratio of 16:9 and a 16:9 guide frame 203a for a still image having the aspect ratio of 16:9 are displayed in the picked up image display region 201. An image in the regions defined by the guide frames indicates a recording moving image region and a recording still image region, and the user can discriminate a region of actual recording data from each guide frame.

The pattern (b) corresponds to the image pickup mode wherein the aspect ratio of a moving image is 16:9 and the aspect ratio of a still image is 4:3. The pattern (b) represents that the 16:9 guide frame 202a for a moving image having the aspect ratio of 16:9 and a 4:3 guide frame 203b for a still image having the aspect ratio of 4:3 are displayed in the picked up image display region 201. The pattern (c) corresponds to the image pickup mode wherein the aspect ratio of a moving image is 4:3 and the aspect ratio of a still image is 16:9. The pattern (c) represents that a 4:3 guide frame 202b for a moving image having the aspect ratio of 4:3 and the 16:9 guide frame 203a for a still image having the aspect ratio of 16:9 are displayed in the picked up image display region 201. The pattern (d) corresponds to the image pickup mode wherein the aspect ratio of a moving image is 4:3 and the aspect ratio of a still image is 4:3. The pattern (d) represents that the 4:3 guide frame 202b for a moving image having the aspect ratio of 4:3 and the 4:3 guide frame 203b for a still image having the aspect ratio of 4:3 are displayed in the picked up image display region 201.

If the image pickup mode is changed, then the guide frames displayed on the display section are changed, and the user can discriminate the recording moving image region and the recording still image region to be recorded on the recording media based on the guide frames displayed on the display section.

Figure 3:
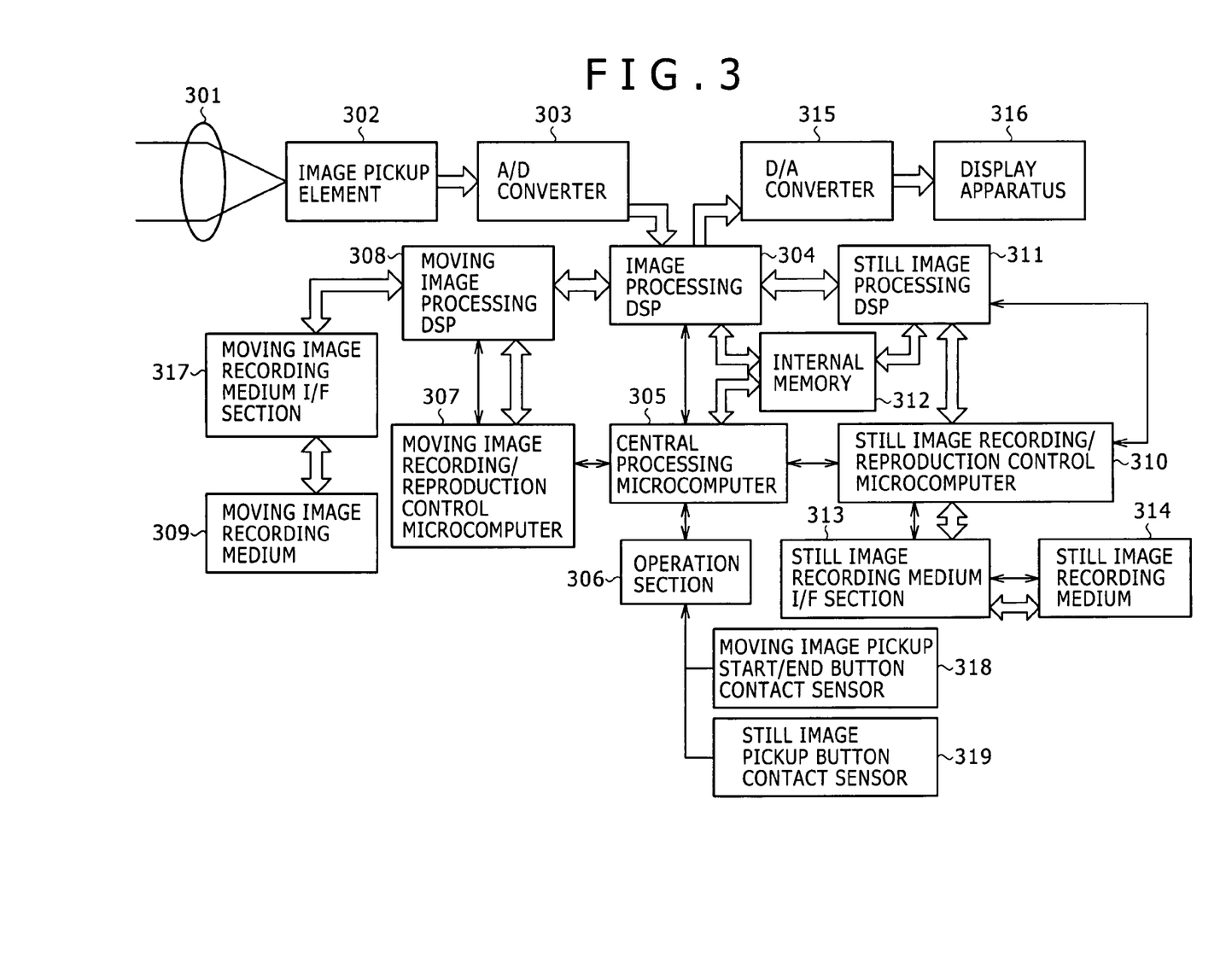
FIG. 3 is a block diagram showing a configuration of the image pickup apparatus of the present invention.
Figure 4:
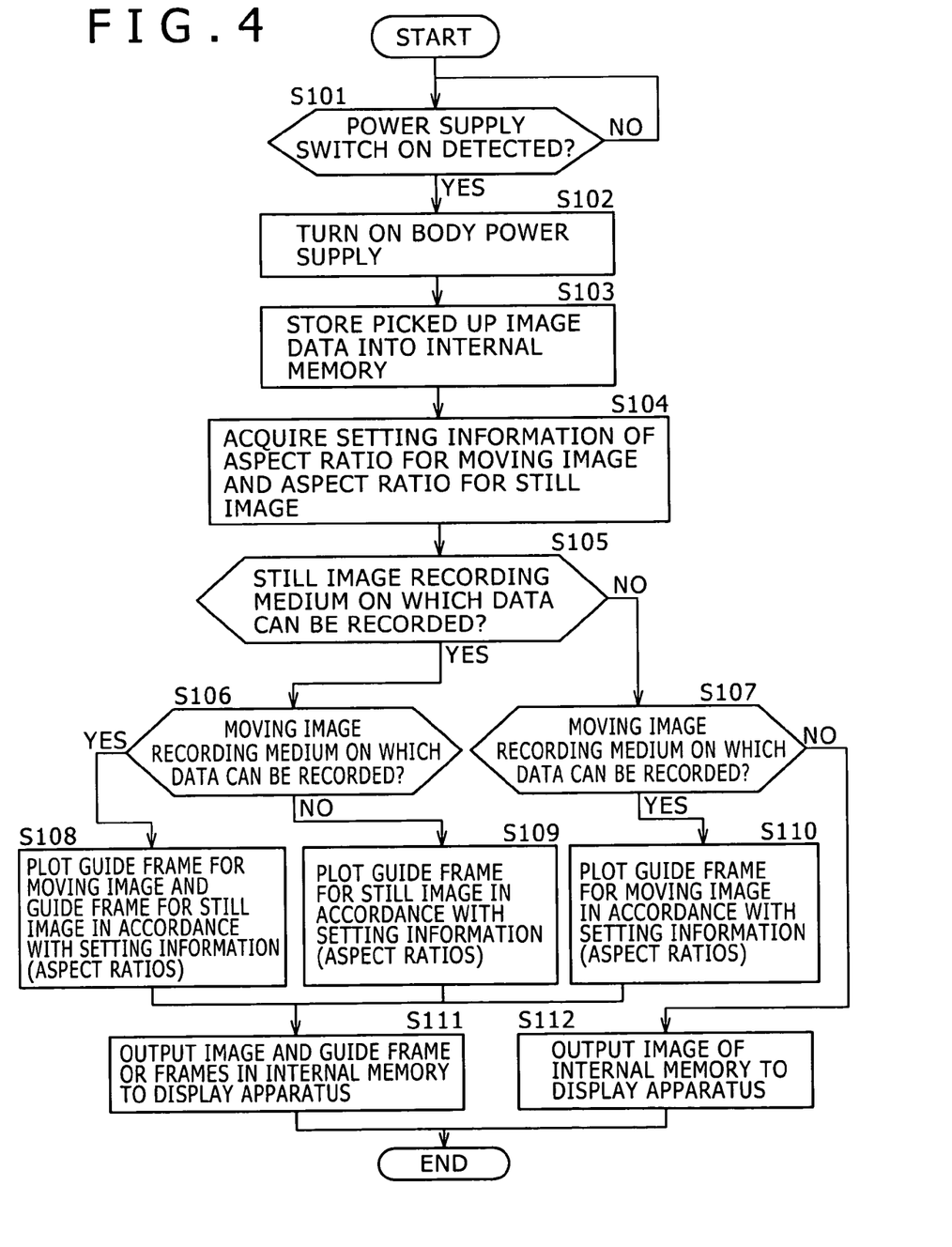
FIG. 4 is a flow chart illustrating a processing sequence of a guide frame displaying process executed by the image pickup apparatus of the present invention.
Figure 5:
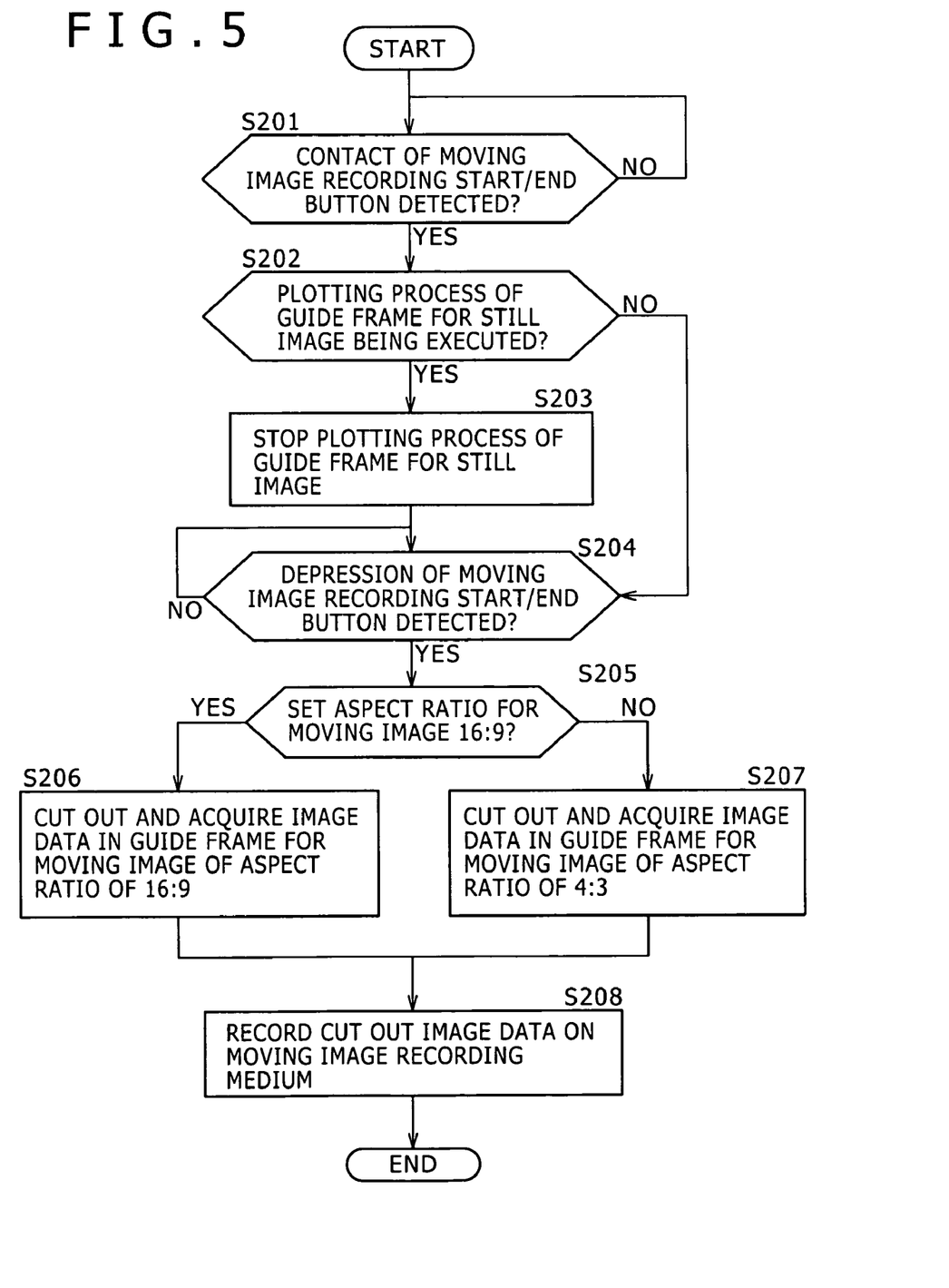
FIG. 5 is a flow chart illustrating a processing sequence where image pickup and recording of moving images are performed by the image pickup apparatus of the present invention.
Figure 6:
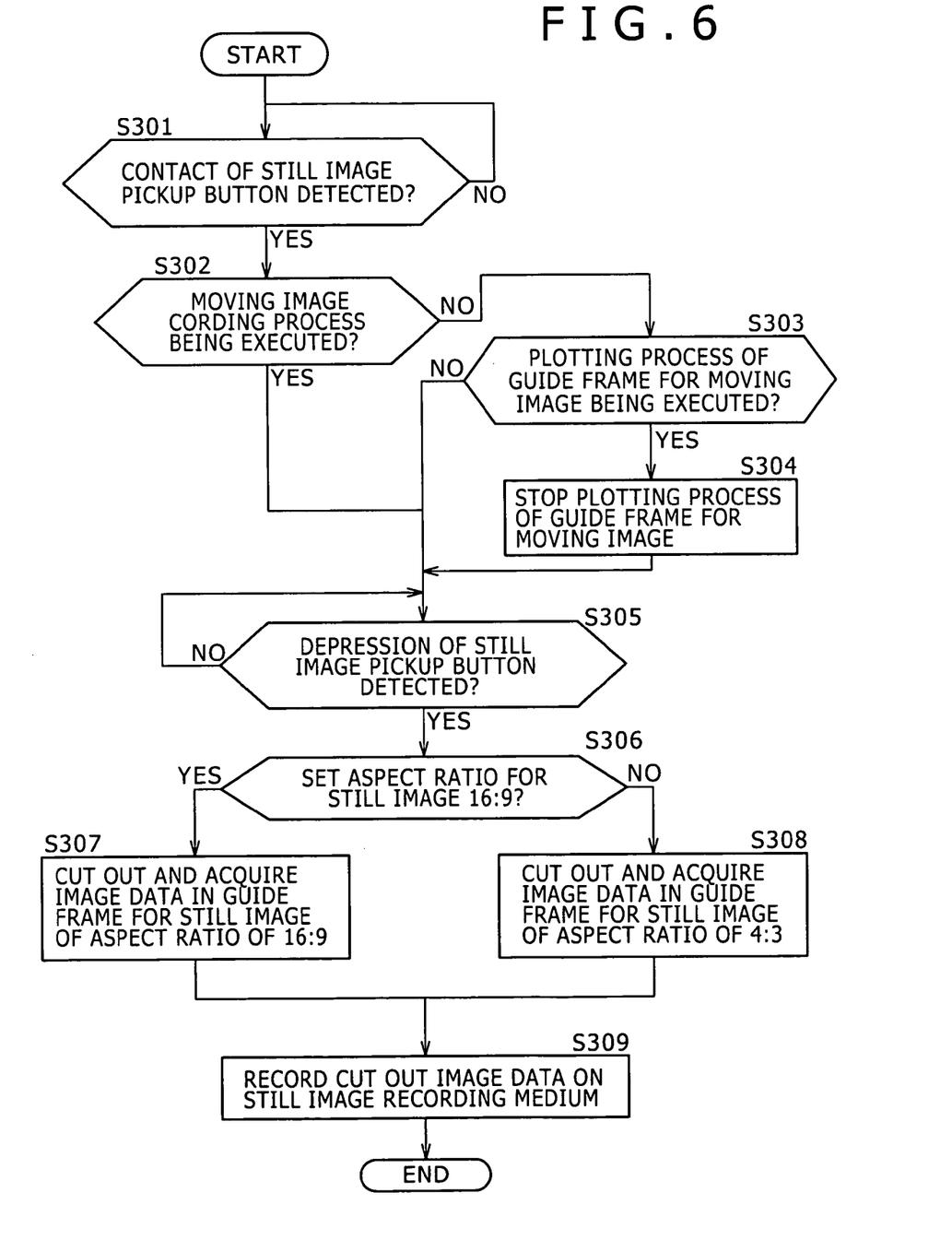
FIG. 6 is a flow chart illustrating a processing sequence where image pickup and recording of a still image are performed by the image pickup apparatus of the present invention.

Now, a detailed configuration of the digital video camera which forms the image pickup apparatus of the present invention and a process executed by the image pickup apparatus are described with reference to a block diagram of FIG. 3 and flow charts of FIGS. 4 to 6. In FIG. 3, a void arrow mark indicates a flow of an image signal, and an arrow mark of a solid line indicates a flow of a control signal. It is to be noted that, while also inputting and recording of sound data are performed by the image pickup apparatus, since processing of sound data has no direct relation to the present invention, FIG. 3 eliminates illustration of a flow of any sound signal.

First, a displaying processing sequence for guide frames is described with reference to FIGS. 3 and 4. In FIG. 3, a display apparatus 316 corresponds to the viewfinder 102 or the liquid crystal display section 103 of the image pickup apparatus 100 described hereinabove with reference to FIG. 1, and a picked up image and guide frames are displayed on the display apparatus 316.

If a user operates an operation section 306 to switch on a power supply switch of the image pickup apparatus, then a central processing microcomputer 305 detects the instruction and activates a power supply. This process corresponds to a process that the power supply to the body of the image pickup apparatus is turned on at step S102 of the flow chart of FIG. 4 after it is decided at step S101 that switching on of the power supply switch is detected (Yes at step S101). It is to be noted that the central processing microcomputer 305 is a control section for controlling the entire video camera as the image pickup apparatus.

A subject image picked up through a lens 301 is formed on an image pickup element 302 formed from, for example, a CCD unit and outputted as image data from the image pickup element 302. The image data outputted from the image pickup element 302 are converted into a digital signal by an A/D converter 303 and then inputted to and stored into an image processing DSP (Digital Signal Processor) 304. This process is executed at step S303.

The image data inputted to the image processing DSP 304 undergo various digital processes required prior to a recording process of the image data such as an image correction process and a data conversion process. The image data as a result of the processes by the image processing DSP 304 are transferred to an internal memory 312. This process corresponds to a process at step S103 of FIG. 4.

It is to be noted that, upon image pickup, the user would perform a process of setting recording aspect ratios for a moving image and for a still image through operation of the operation section 306. The setting information is acquired by the central processing microcomputer 305. This process corresponds to a process at step S104 of FIG. 4.

The central processing microcomputer 305 acquires the setting information of the user as one of the combinations of
(a) the aspect ratio for moving images of 16:9 and the aspect ratio for still images of 16:9,
(b) the aspect ratio for moving images of 16:9 and the aspect ratio for still images of 4:3,
(c) the aspect ratio for moving images of 4:3 and the aspect ratio for still images of 16:9, and
(c) the aspect ratio for moving images of 4:3 and the aspect ratio for still images of 4:3.

The central processing microcomputer 305 performs a processing of plotting the guide frames of one of the patterns (a) to (d) described hereinabove with reference to FIG. 2A in the internal memory 312 based on the acquired setting information.

Then at step S105, the central processing microcomputer 305 verifies whether or not a medium on which a still image can be recorded is loaded in the image pickup apparatus. If a medium on which a still image can be recorded is loaded in the image pickup apparatus, then the processing advances to step S106, at which the central processing microcomputer 305 further verifies whether or not a medium on which moving images can be recorded is loaded in the image pickup apparatus.

If a medium on which a still image can be recorded is loaded and another medium on which moving images can be recorded is loaded in the image pickup apparatus, then the processing advances to step S108. At step S108, the central processing microcomputer 305 performs a process of plotting guide frames of one of the patterns (a) to (d) described hereinabove with reference to FIG. 2A in the internal memory 312 based on the aspect ratio information for moving images and for still images described hereinabove.

Then at step S111, the central processing microcomputer 305 issues an instruction to the image processing DSP 304 to output the data stored in the internal memory 312, that is, the image data transferred through the image processing DSP 304 and the recording region guide frames plotted by the central processing microcomputer 305 to the display apparatus 316. The image processing DSP 304 outputs the image data and the recording region guide frames in the internal memory 312 in a superposed relationship with each other to a D/A converter 315. The D/A converter 315 converts the input digital signal into an analog signal and outputs the analog signal to the display apparatus 316.

The display apparatus 316 is the viewfinder 102 or the liquid crystal display section 103 of the image pickup apparatus 100, and the picked up image data are displayed on the display apparatus 316 together with the guide frames having one of the patterns described hereinabove with reference to FIG. 2A.

On the other hand, if it is decided at step S105 that a medium on which a still image can be recorded is loaded in the image pickup apparatus and then it is decided at step S106 that a medium on which moving images can be recorded is not loaded in the image pickup apparatus, then the processing advances to step S109. At step S109, the central processing microcomputer 305 performs a process of plotting only a guide frame for a still image in the internal memory 312 based on the aspect ratio setting information for still images. The guide frame for a still image in this instance is one of the guide frames of the aspect ratios of 16:9 and 4:3 in accordance with the setting of the user. In this instance, no guide frame for a moving image is displayed.

Then at step S111, the central processing microcomputer 305 issues an instruction to the image processing DSP 304 to output the data stored in the internal memory 312, that is, the image data transferred through the image processing DSP 304 and the recording region guide frame for a still image plotted by the central processing microcomputer 305 to the display apparatus 316. The image processing DSP 304 outputs the image data and the recording region guide frame in the internal memory 312 in a superposed relationship with each other to the D/A converter 315. The D/A converter 315 converts the input digital signal into an analog signal and outputs the analog signal to the display apparatus 316.

The display apparatus 316 displays only the guide frame for a still image having one of the aspect ratios of 16:9 and 4:3 in accordance with the setting of the user together with the image information. In this instance, no guide frame for a moving image is displayed.

On the other hand, if it is decided at step S105 that a medium on which a still image can be recorded is not loaded in the image pickup apparatus, then the processing advances to step S107, at which the central processing microcomputer 305 decides whether or not a medium on which moving images can be recorded is loaded in the image pickup apparatus. If it is decided that a medium on which moving images can be recorded is loaded in the image pickup apparatus, then the processing advances to step S110, at which the central processing microcomputer 305 performs a process of plotting only a guide frame for a moving image in the internal memory 312 based on the aspect ratio setting information for moving images. The guide frame for a moving image in this instance is one of the guide frames of the aspect ratios of 16:9 and 4:3 in accordance with the setting of the user. In this instance, no guide frame for a still image is plotted.

Then at step S111, the central processing microcomputer 305 issues an instruction to the image processing DSP 304 to output the data stored in the internal memory 312, that is, the image data transferred through the image processing DSP 304 and the recording region guide frame for a moving image plotted by the central processing microcomputer 305 to the display apparatus 316. The image processing DSP 304 outputs the image data and the recording region guide frame in the internal memory 312 in a superposed relationship with each other to the D/A converter 315. The D/A converter 315 converts the input digital signal into an analog signal and outputs the analog signal to the display apparatus 316.

The display apparatus 316 displays only the guide frame for a moving image having one of the aspect ratios of 16:9 and 4:3 in accordance with the setting of the user together with the image information. In this instance, no guide frame for a still image is displayed.

On the other hand, if it is decided at step S105 that a medium on which a still image can be recorded is not loaded in the image pickup apparatus and then it is decided at step S107 that a medium on which moving images can be recorded is not loaded in the image pickup apparatus, then the processing advances to step S112 without performing a plotting process of a guide frame. At step S112, the central processing microcomputer 305 issues an instruction to the image processing DSP 304 to output the data stored in the internal memory 312, that is, only the image data transferred through the image processing DSP 304, to the display apparatus 316. The image processing DSP 304 outputs the image data in the internal memory 312 to the D/A converter 315. The D/A converter 315 converts the input digital signal into an analog signal and outputs the analog signal to the display apparatus 316.

The display apparatus 316 displays only the image information which does not include any guide frame. In other words, none of the guide frames for a moving image and for a still image is displayed.

As described hereinabove, where the image pickup apparatus is in a state wherein image data cannot be recorded such as in a case wherein a medium on which moving images or a still image can be recorded is not loaded in the image pickup apparatus, since a guide frame corresponding to an image of a category (moving image or still image) which is not in a recordable state is not plotted in the internal memory 312, it is not displayed on the display apparatus 316 either. In other words, only a guide frame corresponding to the image category which can be recorded effectively is displayed on the display apparatus 316 together with the picked up image. The user can recognize, based on any guide frame displayed on the display section, a moving image region or a still image region recorded on a recording medium and recording possibility information of whether or not recording is possible.

Now, details of a process executed by the image pickup apparatus when the user records moving images are described with reference to FIGS. 3 and 5. The processing flow illustrated in FIG. 5 is executed after the processing flow illustrated in FIG. 4 is executed, and is executed in a state wherein a recording medium on which moving images are to be recorded is loaded in the image pickup apparatus and moving images can be recorded on the recording medium. At a point of time at which the process of the processing flow of FIG. 5 is started, picked up image data and at least a guide frame for a moving image are displayed on the display apparatus shown in FIG. 3. If the image pickup apparatus is in a state wherein a still image can be recorded, then also a guide frame for a still image is displayed.

If the user intends to start recording of moving images, then the user would place its finger into contact with the moving image pickup start/end button set to the operation section 306 for issuing an instruction to start and end recording of moving images. As a result of the process, a moving image pickup start/end button contact sensor 318 set to the moving image pickup start/end button detects the contact of the finger of the user. The contact detection information by the moving image pickup start/end button contact sensor 318 is transmitted to the central processing microcomputer 305. This process corresponds to a process that the processing advances to step S202 after it is decided at step S201 that the contact with the moving image recording start/end button is detected (Yes at step S201). It is to be noted that the moving image pickup start/end button contact sensor 318 is set to the surface of the moving image pickup start/end button and detects, before the moving image pickup start/end button is depressed, contact of a finger of a user and outputs a detection signal to the central processing microcomputer 305.

Then at step S202, the central processing microcomputer 305 decides whether or not a plotting process of a guide frame for a still image in the internal memory 312 is being executed. If a plotting process of a guide frame for a still image in the internal memory 312 is being executed, then the central processing microcomputer 305 stops the plotting process of a guide frame for a still image and executes a process for erasing the guide frame for a still image in the internal memory 312 at step S203. It is to be noted that, at this point of time, a plotting and displaying process of the guide frame for a moving image is being executed continuously. The guide frame for a moving image has an aspect ratio based on the setting information of the user and has the aspect ratio of 16:9 or 4:3.

In particular, the central processing microcomputer 305 continues the process of plotting only a guide frame for a moving image in the internal memory 312 based on the aspect ratio setting information for moving images to issue an instruction to the image processing DSP 304 to output the data stored in the internal memory 312, that is, the image data transferred through the image processing DSP 304 and the recording region guide frame for a moving image plotted by the central processing microcomputer 305, to the display apparatus 316. The image processing DSP 304 outputs the image data and the recording region guide frame in the internal memory 312 in a superposed relationship with each other to the D/A converter 315. The D/A converter 315 converts the input digital signal into an analog signal and outputs the analog signal to the display apparatus 316.

Then, if a depression signal of the moving image pickup start/end button set to the operation section 306 is inputted to the central processing microcomputer 305, then the central processing microcomputer 305 decides at step S205 whether or not the aspect ratio for a moving image set by the user is 16:9.

If the set aspect ratio for a moving image is 16:9, then the processing advances to step S206, at which the central processing microcomputer 305 cuts out and acquires the image in the guide frame for a moving image of the aspect ratio of 16:9 from the picked up image. Then at step S208, the central processing microcomputer 305 executes a process of recording the cut out image on the moving image recording medium.

If the set aspect ratio for a moving image is not 16:9 at step S205, then the processing advances to step S207, at which the central processing microcomputer 305 cuts out and acquires the image in the guide frame for a moving image of the aspect ratio of 4:3 from the picked up image. Then at step S208, the central processing microcomputer 305 executes a process of recording the cut out image on the moving image recording medium.

The processes at the steps beginning with step S204 are described with reference to FIG. 3. When the depression signal of the moving image pickup start/end button is inputted to the central processing microcomputer 305, the central processing microcomputer 305 supplies a control signal representing that an instruction for recording moving images has been issued to the image processing DSP 304 and a moving image recording/reproduction control microcomputer 307. In accordance with the control signal, the image processing DSP 304 inputs to a moving image processing DSP 308 image data having set aspect ratio, that is, the aspect ratio of 16:9 or the aspect ratio of 4:3, in one of the guide frame regions of the moving image recording regions from among the image data in the entire field of view displayed on the display apparatus 316, from the image processing DSP 304.

The moving image processing DSP 308 performs a compression process in accordance with a predetermined format such as MPEG compression for the image data inputted from the image processing DSP 304, and adds additional information such as index information, data identification information and processing mode information to the compressed image data to convert the image data into a predetermined format signal. Then, the moving image processing DSP 308 records the resulting moving image data on a moving image recording medium 309 through a moving image recording medium I/F (interface) section 317.

In this manner, upon recording processing of moving images, the display apparatus 316 such as a viewfinder or a liquid crystal display section displays only the guide frame for a moving image in accordance with an aspect ratio set by the user. Consequently, the user can accurately grasp the image region for moving images to be recorded actually thereby to perform accurate moving image recording.

Now, details of a process executed by the image pickup apparatus when the user records a still image are described with reference to FIGS. 3 and 6. Also the processing flow illustrated in FIG. 6 is executed after the processing flow illustrated in FIG. 4 is executed similarly to the processing flow illustrated in FIG. 5, and is executed in a state wherein a recording medium on which a still image is to be recorded is loaded in the image pickup apparatus and a still image can be recorded on the recording medium. At a point of time at which the process of the processing flow of FIG. 6 is started, picked up image data and at least a guide frame for a still image are displayed on the display apparatus shown in FIG. 3. If the image pickup apparatus is in a state wherein moving images can be recorded, then also a guide frame for a moving image is displayed.

When the user intends to start recording of a still image, the user would place its finger into contact with the still image pickup button set to the operation section 306 for issuing an instruction to start and end recording of a still image. As a result of the process, a still image pickup button contact sensor 319 set to the still image pickup button detects the contact of the finger of the user. The contact detection information by the still image pickup button contact sensor 319 is transmitted to the central processing microcomputer 305. This process corresponds to a process that the processing advances to step S302 after it is decided at step S301 that the contact with the still image pickup button is detected (Yes at step S301). It is to be noted that the still image pickup button contact sensor 319 is set to the surface of the still image pickup button and detects, before the still image pickup button is depressed, contact of a finger of a user and outputs a detection signal to the central processing microcomputer 305.

Then at step S302, the central processing microcomputer 305 decides whether or not a recording process of moving images is being executed. If a recording process of moving images is not being executed, then the processing advances to step S302, at which the central processing microcomputer 305 decides whether or not a plotting process of the guide frame for a moving image in the internal memory 312 is being executed. If a plotting process of the guide frame for a moving image in the internal memory 312 is being executed, then the central processing microcomputer 305 stops the plotting process of the guide frame for a moving image and executes a process for erasing the guide frame for a moving image in the internal memory 312 at step S304. It is to be noted that, at this point of time, a plotting and displaying process of the guide frame for a still image is being executed continuously. The guide frame for a still image has an aspect ratio based on the setting information of the user and has the aspect ratio of 16:9 or 4:3.

In particular, when moving image recording is not being executed, the central processing microcomputer 305 continues the process of plotting only the guide frame for a still image in the internal memory 312 based on the aspect ratio setting information for a still image. Then, the central processing microcomputer 305 issues an instruction to the image processing DSP 304 to output the data stored in the internal memory 312, that is, the image data transferred through the image processing DSP 304 and the recording region guide frame for a still image plotted by the central processing microcomputer 305, to the display apparatus 316. The image processing DSP 304 outputs the image data and the recording region guide frame for a still image in the internal memory 312 in a superposed relationship with each other to the D/A converter 315. The D/A converter 315 converts the input digital signal into an analog signal and outputs the analog signal to the display apparatus 316.

It is to be noted that, if it is decided at step S302 that a recording process of moving images is being executed, then the processes at steps S303 and S304, that is, the process of erasing the guide frame for a moving image, is not executed, but the plotting and displaying process of the two guide frames including the guide frame for a moving image and the guide frame for a still image is executed continuously.

Then, if a depression signal of the still image pickup button set to the operation section 306 is inputted to the central processing microcomputer 305, then the central processing microcomputer 305 decides at step S306 whether or not the aspect ratio for a moving image set in advance by the user is 16:9.

If the set aspect ratio for a still image is 16:9, then the processing advances to step S307, at which the central processing microcomputer 305 cuts out and acquires the image in the guide frame for a still image of the aspect ratio of 16:9 from the picked up image. Then at step S309, the central processing microcomputer 305 executes a process of recording the cut out image on the still image recording medium.

If the set aspect ratio for a still image is not 16:9 at step S306, then the processing advances to step S308, at which the central processing microcomputer 305 cuts out and acquires the image in the guide frame for a still image of the aspect ratio of 4:3 from the picked up image. Then at step S309, the central processing microcomputer 305 executes a process of recording the cut out image on the still image recording medium.

The processes at the steps beginning with step S305 are described with reference to FIG. 3. When the depression signal of the still image pickup button is inputted to the central processing microcomputer 305, the central processing microcomputer 305 supplies a control signal representing that an instruction to record a moving image has been issued to the image processing DSP 304 and a still image recording/reproduction control microcomputer 310. In accordance with the control signal, the image processing DSP 304 inputs to a still image processing DSP 311 image data having the set aspect ratio, that is, the aspect ratio of 16:9 or the aspect ratio of 4:3, in one of the guide frame regions of the still image recording regions from among the image data in the entire field of view displayed on the display apparatus 316, from the image processing DSP 304.

The still image processing DSP 311 performs a compression process in accordance with a predetermined format such as JPEG compression for the image data inputted from the image processing DSP 304, and adds additional information such as index information, data identification information and processing mode information to the compressed image data to convert the image data into a predetermined format signal. Then, the still image processing DSP 311 records the resulting still image data on a still image recording medium 314 through a still image recording medium I/F section 313.

In this manner, upon recording processing of a still image, when moving image recording is not being executed, the display apparatus 316 such as a viewfinder or a liquid crystal display section displays only a guide frame for a still image in accordance with an aspect ratio set by the user. Consequently, the user can accurately grasp the image region of a still image to be recorded actually thereby to perform accurate still image recording. On the other hand, where moving image recording is being executed parallelly, both of a guide frame for a still image and a guide frame for a moving image are displayed in accordance with the aspect ratios set for a still image and a moving image, respectively. The user can confirm both of the guide frame for a still image and the guide frame for a moving image to grasp image regions into which the image data are to be recorded actually and perform accurate recording of a still image and moving images.

As described hereinabove, in the configuration of the present invention, if an image pickup person sets desired aspect ratios in advance, then the image pickup person can perform an accurate recording process for both of moving images and a still image while confirming the angles of view, that is, image regions to be recorded, from guide frames displayed on the display apparatus without changing over the image pickup mode or the power supply mode.

It is to be noted that an image read out from the image pickup element 302 may be subjected to a recording region correction process such as to shift a region of a recording image upwardly or downwardly or/and leftwardly or rightwardly or change the size of the recording image by a zooming process or a process for preventing shaking of the camera by hand which is performed by a camera shaking preventing mechanism. Where the recording region is varied dynamically by such a recording region correction process as described above, the central processing microcomputer 305 executes an updating process of varying a guide frame plotted in the internal memory 312 in response to the variation of the recording image based on such correction processing information. By the process just described, even if the region of a recording image varies by such a zooming process or a camera shaking preventing process as described above, the guide frame is displayed following up the variation of the region of the recording image. Consequently, an accurate guide frame display corresponding to the recording region can be implemented.

It is to be noted that, while, in the embodiment described above, the two aspect ratios of 16:9 and 4:3 are used, the present invention can be applied also where any other aspect ratio is used.

Further, the series of processes described hereinabove can be executed by hardware or by software or by a composite configuration of hardware and software. Where the series of processes is executed by software, a program which records a processing sequence of the software can be installed into a memory in and executed by a computer incorporated in hardware for exclusive use or can be installed into and executed by a computer for universal use which can execute various processes.

For example, the program can be recorded in advance on a hard disk or in a ROM (Read Only Memory) as a recording medium. Or the program may be stored (recorded) temporarily or permanently on a removable recording medium such as a flexible disk, a CD-ROM (Compact Disc-Read Only Memory), an MO (Magneto-Optical) disk, a DVD (Digital Versatile Disk), a magnetic disk or a semiconductor memory. Such a removable recording medium as just described can be provided as package software.

It is to be noted that, while the program can be installed from such a removable recording medium as described above into a computer, it may otherwise be transferred by radio from a download site to the computer or transferred by wire communication through a network such as a LAN (Local Area Network) or the Internet to the computer. The computer can receive the program transferred in this manner and install the program into a recording medium such as a hard disk built therein.

It is to be noted that the processes described in the present specification may be processed in a time series in the order as described or may be processed parallelly or individually depending upon the processing capacity of the apparatus which executes the process or as occasion demands. Further, in the present specification, the term "system" is used to represent a logical set configuration composed of a plurality of apparatus, but the components may not necessarily be housed in the same housing.

While a preferred embodiment of the present invention has been described using specific terms, such description is for illustrative purpose only, and it is to be understood that changes and variations may be made without departing from the spirit or scope of the following claims.

What is claimed is:

1. An image pickup apparatus, comprising:
an image pickup element for picking up a subject image;
a display section for outputting image data acquired by the image pickup element;
a control section for executing a display control of a guide frame to be displayed on the display section; and
a detecting section for detecting a starting recording of a moving image,
wherein the control section executes a control of determining at least a form of a guide frame for a still image based on recording mode setting information for a still image set in advance, a control of outputting the guide frame corresponding to the determined form to the display section, and a control of stopping the outputting of the guide frame for a still image to the display section based on detection information from the detecting section.

2. The image pickup apparatus according to claim 1, wherein the control section executes a control of outputting and stopping the outputting of the guide frame in accordance with whether a recording process of the moving image and the still image on a recording medium is possible.

3. The image pickup apparatus according to claim 1, wherein the recording mode setting information includes a plurality of different aspect ratios for recording images of the moving images and the still images, and the control section determines, based on aspect ratios, the forms of the guide frame for the moving image and the guide frame for the still image.

4. The image pickup apparatus according to claim 1, wherein the detecting section includes a contact sensor for detecting contact with a button for starting recording of the moving image.

5. A guide frame displaying method for an image pickup apparatus, comprising the steps of:
displaying acquired image data on a display section;
executing a display control of a guide frame to be displayed on the display section; and
detecting a starting recording of a moving image,
wherein the control step executes a control of determining at least a form of a guide frame for a still image based on recording mode setting information for a still image set in advance, a control of outputting the guide frame corresponding to the determined form to the display section, and a control of stopping the outputting of the guide frame for a still image to said display section based on detection information from the detecting step.

6. The guide frame displaying method according to claim 5, wherein the controlling step executes a control of outputting and stopping the outputting of the guide frame in accordance with whether a recording process of the moving image and the still image on a recording medium is possible.

7. The guide frame displaying method according to claim 5, wherein the recording mode setting information includes a plurality of different aspect ratios for recording images of the moving images and the still images, and the controlling step determines, based on aspect ratios, the forms of the guide frame for the moving image and the guide frame for the still image.

8. The guide frame displaying method according to claim 5, wherein the detecting step uses a contact sensor for detecting contact with a button for starting recording of the moving image.

9. A non-transitory computer readable medium recorded therein an executable program for causing a computer to execute a display control of a guide frame, the executable program comprising the steps of:
displaying acquired image data on a display section;
executing a display control of a guide frame to be displayed on the display section; and
detecting a starting recording of a moving image,
wherein the control step executes a control of determining at least a form of a guide frame for a still image based on recording mode setting information for a still image set in advance, a control of outputting the guide frame corresponding to the determined form to the display section, and a control of stopping the outputting of the guide frame for a still image to said display section based on detection information from the detecting step.

* * * * *